Feb. 17, 1948. M. H. BROSSIA 2,436,095
HUTCH FOR SMALL LIVESTOCK
Filed Jan. 11, 1946

INVENTOR.
Merlin H. Brossia
BY Carlos G. Stratton
ATTORNEY

Patented Feb. 17, 1948

2,436,095

UNITED STATES PATENT OFFICE 2,436,095

HUTCH FOR SMALL LIVESTOCK

Merlin H. Brossia, Whittier, Calif.

Application January 11, 1946, Serial No. 640,439

8 Claims. (Cl. 119—18)

My invention relates to a coop or hutch for small livestock, as chickens, rabbits and the like, and it has especial reference to a unit housing that may be arranged in multiples to provide a battery for a large number of birds or animals, with means for conveniently feeding and watering them.

An object of the invention is to provide a simple and inexpensive hutch unit, in which the stock therein may be fed the usual ration of ordinary feeds, and also limited amounts of other or special feeds required or advantageous to the health and condition of the stock.

Another object of the invention is to provide a convenient and practical hutch in which special feeds, supplementing the usual daily feeds, may be apportioned in a compartmented enclosure and so controlled and regulated that access to the supply of the special feed may be cut off after a predetermined period of time within which the stock is calculated to have consumed a sufficient quantity.

A still further object of the invention is to provide a unit hutch in which the feed hoppers may be readily and quickly cleaned of dust, feed fragments and residual accumulations.

My invention also has for its objects to provide such means in connection with a hutch, that are positive in operation, convenient in use, easily assembled, economical of manufacture, relatively simple, and of general superiority and serviceability.

The invention also comprises novel details of construction and novel combinations of and arrangements of parts, which will more fully appear in the course of the following description. However, the drawing merely shows and the following description merely describes one embodiment of the invention, which is given by way of illustration or example only.

In the drawing, like reference characters designate similar parts in the several views.

Figure 1:
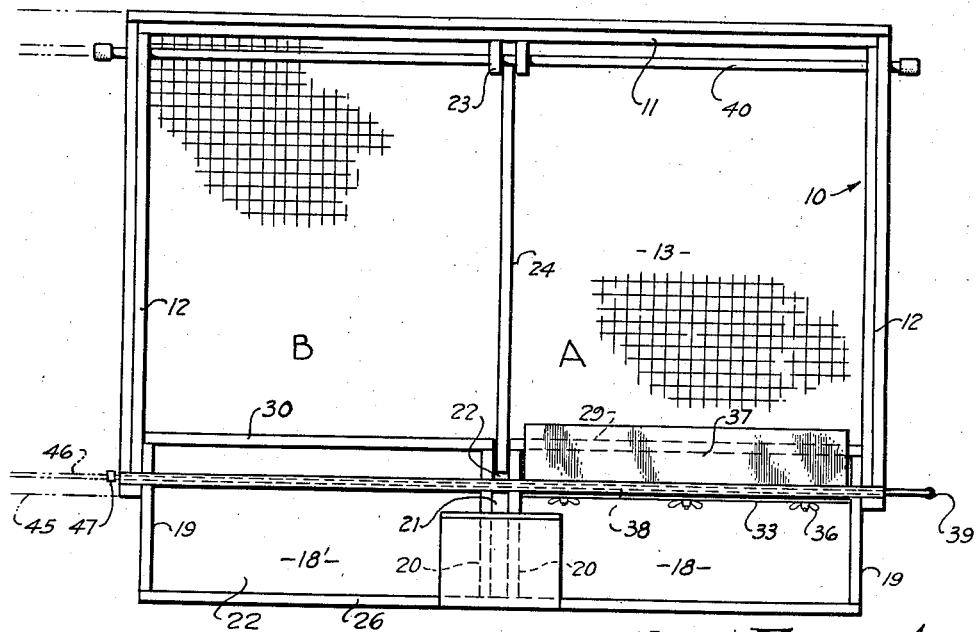
Fig. 1 is a plan view showing my invention.
Figure 2:
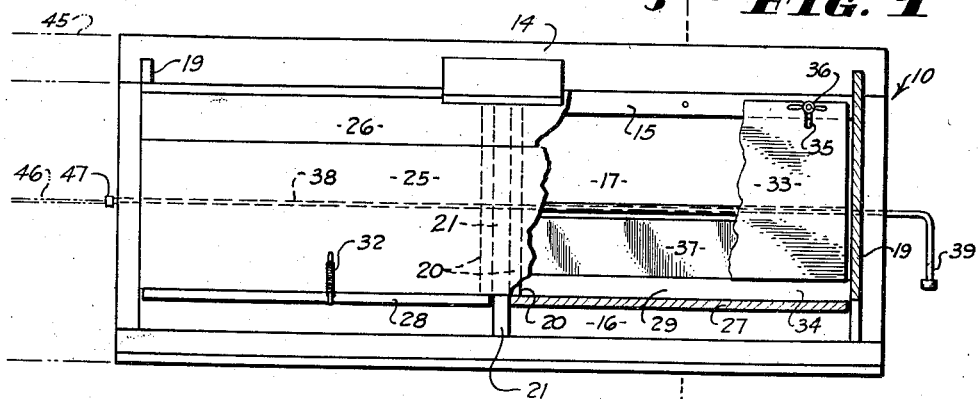
Fig. 2 is a front elevation partly broken to illustrate parts otherwise hidden.
Figure 3:
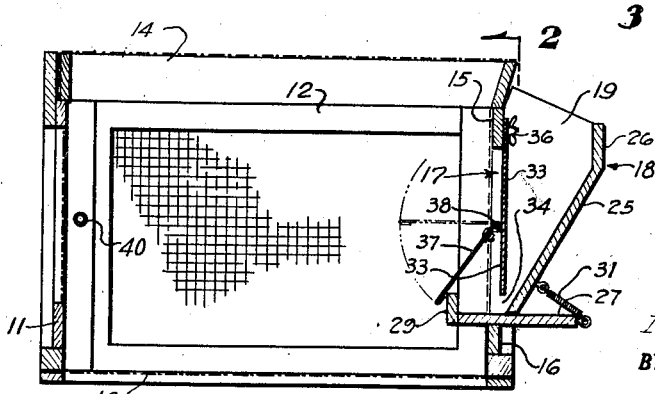
Fig. 3 is a section on line 3—3 of Fig. 2, looking in the direction of the arrow.

Referring particularly to the drawing, 10 designates an enclosure, composed of the rear wall 11, side walls 12, and reticulate bottom 13, connected together in usual manner to form a hutch, with a cover 14 that is suggested in Fig. 3, but is omitted from Fig. 1 for purposes of clarity. The front of the side walls 12 is connected by a pair of vertically spaced horizontal rails 15 and 16, which provides an opening 17. In said opening are fitted hoppers 18 and 18' which project beyond the front of the hutch. Each of the hoppers is formed of side members 19 and 20, the members 19 being arranged to be nailed or otherwise fastened to the sides 12 of the hutch, and the members 20 being spaced from each other and secured in spaced relation to a bar or block 21, interposed partly between said side members 20, which at their inner ends provide a space 22. This space co-operates with a guide means 23 on the rear wall of the hutch to provide guide ways for a slideable partition 24, that may be used to divide the hutch into two compartments A and B, each of which is provided with a hopper or funnel for different feeds, as hereinafter explained. The outer wall of the hoppers is provided by an inwardly inclined board 25 and a vertical strip 26, that are common to both hoppers. Said outer wall members 25 and 26 are relatively stationary.

The bottoms of the funnels or hoppers are plates 27 and 28 that are slidably mounted on the bottom rail 16 and which, at their inner ends, co-operate with fixed abutment members 29 and 30, carried on the inner edges of the respective plates 27 and 28, to form troughs into which the feed is delivered through the chutes or hoppers. Springs 31 and 32, respectively, are employed to hold said plates 27 and 28 against said abutment members 29 and 30. These plates are withdrawable, against the action of the springs 31 and 32, with respect to the abutment members and the bottoms of the hoppers. This withdrawing movement causes the bottom of the wall member 25 to scrape the top of the plates 27 and 28, to cause particles thereon, as well as dust and dirt, to gravitate through the reticulate bottom to the ground, thereby cleaning the feed board or trough. When the boards 27 and 28 are released, the springs 31 and 32 return them to the positions shown in the drawings.

The hopper or funnel 18' serves to deliver the feed that is required for daily consumption by the stock, and the hopper 18 serves to deliver a special ration that is required for the health and development of the livestock. For this latter purpose, a panel 33 is secured to the cross rail 15 and depends therefrom. This panel 33 forms the front of the hopper or chute 18 and terminates a short distance above the bottom plate 27 and in proximity to the bottom of the chute 18 to provide a restricted throat 34, which communicates with the trough formed by said plate and the abutment 29. The panel 33 is provided near the top with elongated openings 35, through which are arranged to extend bolts having wing nuts 36. It is believed clear without further illustration that cap screws or other suitable fastening means may be substituted for the wing nuts 36. The panel is adjustable by means of the wing nuts or cap screws to vary the area of the throat 34 and is locked in position of adjustment by said wing nuts or cap screws.

The special feed in this hopper 18 gravitates to and supplies the trough with the feed required. This feeding of the special diet is limited in quantity and is regulated by the length of time the stock has eaten of it. Thereafter, access to the trough containing the special feed is barred and this is accomplished by a flap valve 37 that is secured to a rod 38 extending through the unit hutch and provided on the outside of one of the walls 12 with a lever arm 39 or other suitable means for operating same and the valve to open or closed position. Preferably the rod 38 is friction fitted in the hutch so that, when the valve is moved to open position, it will remain in such position for the period of time required for the stock to have consumed its predetermined allotment. Thereupon, the attendant operates the lever arm to close access to the trough through the valve 37, at which time the valve rests upon the abutment member 29. An adjoining unit 45 preferably abuts the hutch just described. As many successive units may be added, as desired. Each successive unit may have its valve control rod 46 connected to the next previous valve control rod, as suggested by the coupling 47.

The usual water pipe 40, with usual means for the stock to obtain water therefrom, is provided in the hutch.

It will be noted that, by the means hereinabove described, the feed board or feed trough may be quickly cleaned, without having to open or reach into the hutch. Such cleaning operation can be entirely done from without the hutch.

A prime objective in the design of the flap 37 is to facilitate the adding of subsequent or additional units to form a line of hutches. That is, hutch rows can be made indefinite in length and the operation of all the flap valves in each row of hutches may be operated simultaneously by the single lever means 39.

While I have illustrated and described what I now regard as the preferred embodiment of my invention, the construction is, of course, subject to modifications, without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent of the United States, is:

1. A hutch comprising a substantially rectangular enclosure, a partition dividing the enclosure into two compartments, and each compartment provided with an opening, hoppers secured in said openings and extending beyond the front of the enclosure, a panel secured to the front of the enclosure cooperating with one of said hoppers to form the front thereof and provide at the bottom thereof a restricted throat, abutment members within said compartments, a movable bottom member for each of said hoppers co-operating with said abutments to form troughs, a flap member to open and close access to one of said troughs, and means to operate said flap member.

2. A hutch comprising an enclosure having front and rear frame members and side members and a reticulate bottom, a partition within said enclosure dividing same into two compartments, each compartment having an opening in the front, a hopper secured in each opening of said compartments, an abutment member in each compartment, shelves slidable relative to the bottoms of said hoppers and co-operating with said abutments to form troughs, a panel secured to one of said frame members forming the front of one of said hoppers and providing at the bottom thereof a restricted throat, a flap to open and close access to one of said troughs, said flap in closed position resting against said abutment, and means to operate said flap, said flap being maintained in closed position by said means.

3. A hutch comprising an enclosure having front and rear frame sections and side sections, the front section thereof provided with spaced openings, a hopper secured in each said opening, abutments within said enclosure, movable bottoms for said hoppers co-operating with said abutments to form troughs, a panel depending from said front frame section co-operating with one of said hoppers to form the front thereof and provide at the bottom thereof a restricted throat, a flap member to open and close said trough, a rod on which said flap member is mounted, and means to operate said rod.

4. A hutch comprising an enclosure having front and rear sections and side sections, the front section provided with openings, a hopper secured in each of said openings, abutment members within said enclosure, slide plates forming bottoms for said hoppers, the inner ends of said plates co-operating with said abutments to form troughs, a panel depending from the front section of the enclosure forming the front wall of one of said hoppers and providing a throat at the bottom of said hopper, and a flap valve to open and close the trough communicating with said throat.

5. A hutch comprising a substantially rectangular frame forming an enclosure having a reticulate bottom, the front frame section having openings, hoppers secured in said openings, a panel forming the front of one of said hoppers and providing at the bottom thereof a throat, said panel being adjustable to vary the area of the throat, abutment members in said enclosure, bottom members for said hoppers co-operating with said abutment members to form troughs, one of said troughs communicating with throat of one of said hoppers, a flap member to open and close said trough, and means to operate said flap member.

6. A hutch comprising an enclosure having an opening in the front thereof, a hopper secured in said opening, adjustable means co-operating with said hopper to provide a discharge throat therefrom, an abutment member in said enclosure, a slidable plate forming the bottom of said hopper and co-operating with said abutment to form a trough with which the throat in said hopper communicates, spring means for holding said plate in engagement with said abutment, and a valve to open and close said trough.

7. A hutch unit comprising an enclosure having openings, hoppers in said openings, abutment members in said enclosure and above the bottom thereof, slidable plates forming the bottoms of said hoppers and co-operating with said abutment members to form troughs, spring means to hold said plates against said abutment members, a panel secured over the front of one of said openings and forming the front of one of said hoppers, the lower end of said panel being spaced from the slidable plate and the bottom of the hopper to provide a throat communicating with a trough, said panel being adjustable to vary the area of the throat, a flap to open and close said trough and means to operate said flap.

8. A hutch comprising an enclosure having a plurality of openings, a hopper in one of said openings for normal feed and a hopper in the other of said openings for special feed, removable bottoms for said hoppers, abutment members for limiting the inward movement of said bottoms and co-operating with said bottoms to provide troughs, a panel depending from the front of said enclosure and forming the front wall of said special feed hopper, means forming a closure for said special feed trough, and manual means to operate said closure means to open position, said means operable to closed position when released.

MERLIN H. BROSSIA.

REFERENCES CITED

The following references are of record in the file of this patent:

UNITED STATES PATENTS

| Number | Name | Date |
|---|---|---|
| 1,017,758 | Howell | Feb. 20, 1912 |
| 1,036,882 | Moore | Aug. 27, 1912 |
| 1,286,676 | Little | Dec. 3, 1918 |
| 1,491,210 | Steinback | Apr. 22, 1924 |
| 2,206,383 | Adams | July 2, 1940 |